Dec. 22, 1931.  F. N. TONKINSON  1,837,380
DIRECTION INDICATING SIGNAL FOR AUTOMOBILES
Filed Jan. 26, 1929
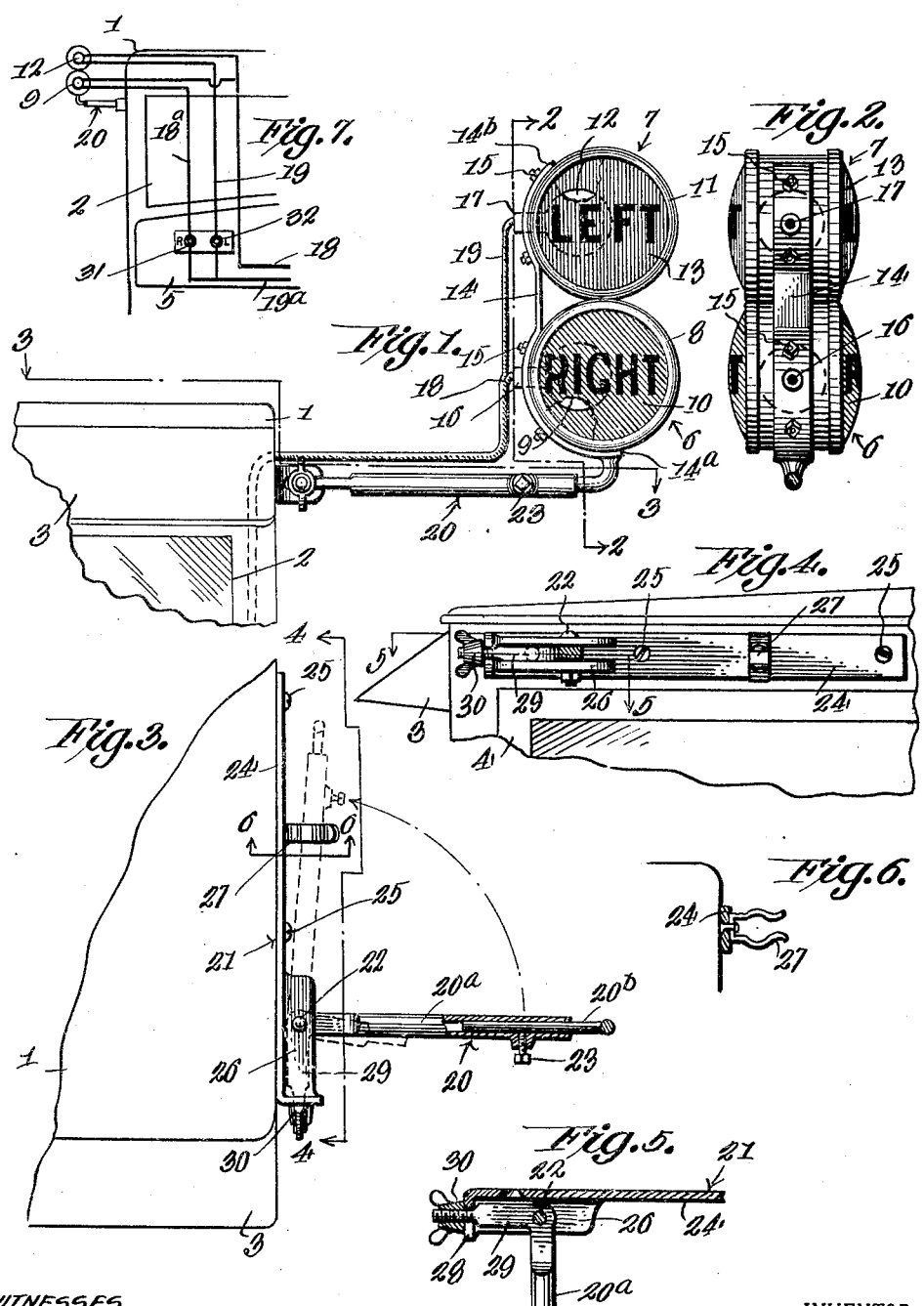
WITNESSES
Guy M Spring
INVENTOR.
FRANK N. TONKINSON
BY
Irving L. Cathran
ATTORNEYS.

Patented Dec. 22, 1931

1,837,380

UNITED STATES PATENT OFFICE

FRANK N. TONKINSON, OF LONGMONT, COLORADO

DIRECTION INDICATING SIGNAL FOR AUTOMOBILES

Application filed January 26, 1929. Serial No. 335,367.

This invention relates to a signal for automobiles, and has for one of its objects to provide a novel, simple and highly efficient device of this character which shall embody a left turn indicating means and a right turn indicating means capable of being read from the front and rear sides thereof, and which shall embody means for attaching the turn indicating means to the left hand side of the top of an automobile at a point immediately above the driver so as to render the turn indicating means clearly visible to the traffic in front and in rear of the automobile.

The invention has for a further object to provide a signal of the character stated wherein the attaching means shall be adapted to support the turn indicating means one above the other and in outwardly spaced relation to the top of the driver's side of the automobile so as to render them clearly visible to the traffic in front and in rear of the automobile.

The invention has for a further object to provide a signal of the character stated wherein the attaching means shall be adjustable so as to permit the turn indicating means to be supported at different distances from the top of the automobile.

The invention has for a further object to provide a signal of the character stated wherein the attaching means shall be adapted to permit the turn indicating means to be arranged and secured in an inoperative position when the driver does not wish to use the signal.

With the foregoing and other objects in view, the nature of which will appear as the description proceeds, the invention consists in the construction, combination and arrangement of parts hereinafter fully described and claimed, and illustrated in the accompanying drawings, wherein:

Figure 1 is a front elevational view illustrating the application of the signal to an automobile;

Figure 2 is a sectional view taken on the vertical planes indicated by the line 2—2 of Figure 1;

Figure 3 is a sectional view taken on the horizontal planes indicated by the line 3—3 of Figure 1;

Figure 4 is a sectional view taken on the vertical planes indicated by the line 4—4 of Figure 3;

Figure 5 is a sectional view taken on the horizontal planes indicated by the line 5—5 of Figure 4;

Figure 6 is a sectional view taken on the vertical plane indicated by the line 6—6 of Figure 3, and Figure 7 is a diagrammatic view illustrating the wiring system of the signal.

Referring in detail to the drawings, 1 designates the top, 2 the windshield, 3 the visor, 4 the left hand front door, and 5 the instrument board of an automobile of the closed body type.

The signal comprises a right turn indicating means 6 and a left turn indicating means 7. The means 6 comprises a cylindrical casing 8, an incandescent lamp 9 arranged within the casing, and light emitting panels 10 arranged at the front and rear sides of the casing and each bearing the word "Right". The means 7 comprises a cylindrical casing 11, an incandescent lamp 12 arranged within the casing, and light emitting panels 13 arranged at the front and rear sides of the casing and each bearing the word "Left". The bulbs of the lamps 9 and 12 may be white and the panels 10 and 13 may be colored green and red, respectively. If desired, the bulbs of the lamps 9 and 12 may be colored green and red, respectively, and the panels 10 and 13 may be white.

The turn indicating means 6 and 7 are arranged one above the other, and are maintained in this position by a vertical arm 14. The arm 14 is provided with an arcuate portion 14$^a$ for the reception of the inner side of the casing 8, and it is provided with an arcuate portion 14$^b$ for the reception of the corresponding side of the casing 11. The casings 8 and 11 are secured to the arm portions 14$^a$ and 14$^b$ by bolts 15. The sockets 16 and 17 for the lamps 9 and 11 are secured to and extend outwardly beyond the casings 8 and 11 and the arm portions 14$^a$ and 14$^b$, and conductors 18, 18$^a$, 19 and 19$^a$ extend from the sockets to the storage battery, not shown, of the automobile, and to a switch for controlling the lamps 9 and 12.

The turn indicating means 6 and 7 are supported in upright position from and laterally beyond the left hand side of the top 1 of the automobile. The means for supporting the turn indicating means 6 and 7 comprises a horizontal arm 20 and a bracket 21. The arm 20 is fixedly connected at its outer end to the lower end of the arm 14, and is pivotally connected at its inner end, as at 22, to the bracket 21. The arm 20 is of sectional formation, and the sections or parts 20$^a$ and 20$^b$ thereof are telescopically associated to permit its length, and consequently the distance of the turn indicating means 6 and 7 from the top 1, to be varied. The arm sections 20$^a$ and 20$^b$ are secured in adjusted relation by a set screw 23.

The bracket 21 comprises a plate 24 which is secured by screws 25 to the left hand side of the top 1 above the door 4. The plate 24 is provided at its front end with a casing 26, and it is provided rearwardly of the casing with a spring clip 27. The casing 26 is open at its rear end and outer lateral side, and is provided in its front end with a slot 28 which extends through the outer lateral edge of said end. The arm 20 is pivoted to and within the casing 26, and its pivot 22 extends through the upper and lower sides of the casing. The arm 20 is provided at its pivoted end with a forwardly directed locking portion or bolt 29 which has its front end portion projecting through the slot 28. A thumb nut 30 which is mounted upon the projecting end of the bolt 29 and contacts with the front side of the end wall of the casing 26, functions to maintain the turn indicating means 6 and 7 in operative position. When the turn indicating means 6 and 7 are in operative position, they occupy a plane extending transversely of the automobile, and are spaced laterally beyond the left hand side of the automobile, as clearly shown in Figure 1. By removing the nut 30, the turn indicating means 6 and 7 are free for movement into inoperative position, and when in this position they occupy a plane substantially parallel to the side of the automobile to which they are connected. The turn indicating means 6 and 7 are adapted to be swung rearwardly into inoperative position so as to engage the arm 20 with the clip 27 which functions to secure the turn indicating means in inoperative position.

Switches 31 and 32 are provided for the lamps 9 and 12, respectively, and are connected directly to the conductors 18$^a$ and 19. The switches may be mounted upon the steering wheel of the automobile or upon the instrument board 5, as shown in Figure 7.

The arm 20 extends laterally from the driver's side of the automobile, and supports the turn indicating means 6 and 7 in upright position and in a plane extending transversely of the automobile. Due to the manner in which they are supported from the automobile, and to the fact that they are provided with turn indicating symbols at their front and rear sides, the means 6 and 7 are clearly visible to the traffic in front and in rear of the automobile and the driver may indicate to the traffic that he intends to make a right turn or a left turn by closing the switch 31 or the switch 32. While the signal is illustrated in connection with an automobile having a closed body, it is adapted for use in connection with automobiles having open or touring bodies. When it is to be used in connection with an automobile having an open body, the signal is secured to the left hand bow of the top of the automobile above the driver.

While I have described the principle of the invention, together with the structure which I now consider to be the best embodiment thereof, I wish it understood that the structure shown is merely illustrative and that such changes may be made when desired as fall within the scope of the invention as claimed.

What I claim is:

1. In a support, a horizontally extending plate, a casing formed on one end portion of said plate and having one side and one end open, the other end of said casing having a horizontal slot formed therein, an arm connected to said casing by a vertical pivot, a bolt extending from and at right angles to the inner end of said arm, said bolt being adapted at times to extend through said slot, and a nut movably mounted on the end portion of said bolt and frictionally engaging the slotted end of the casing.

2. In a support, a plate, a casing formed on one end portion of said plate and having one side and one end open, the other end of said casing having a slot formed therein, an arm connected to said casing by a pivot, a bolt extending from and at right angles to the inner end of said arm, said bolt being adapted at times to extend through said slot, a nut movably mounted on the end portion of said bolt for frictionally engaging the slotted end wall of the casing, and a clip mounted upon said plate at distance from said casing for releasably receiving the arm when the bolt is moved from out of engagement with the slotted end wall of the casing.

In testimony whereof I affix my signature.

FRANK N. TONKINSON.